United States Patent
Khan et al.

(10) Patent No.: US 6,173,446 B1
(45) Date of Patent: Jan. 9, 2001

(54) APPARATUS FOR LICENSING SOFTWARE APPLICATIONS

(75) Inventors: Rashid N. Khan, Cary; Michael J. Andrade, Raleigh, both of NC (US)

(73) Assignee: Ultimus, Inc., Cary, NC (US)

(*) Notice: Under 35 U.S.C. 154(b), the term of this patent shall be extended for 0 days.

(21) Appl. No.: 09/241,457

(22) Filed: Feb. 2, 1999

(51) Int. Cl.[7] .................................................. G06F 9/445
(52) U.S. Cl. .................................... 717/11; 717/1; 717/11
(58) Field of Search ............................... 395/701, 712; 717/11; 707/203, 204; 705/1, 59; 709/223, 224, 225, 226; 713/1; 380/1

(56) References Cited

U.S. PATENT DOCUMENTS

| | | | |
|---|---|---|---|
| 5,038,318 | 8/1991 | Roseman | 364/900 |
| 5,138,712 * | 8/1992 | Corbin | 713/200 |
| 5,241,620 | 8/1993 | Ruggiero | 395/22 |
| 5,293,615 | 3/1994 | Amada | 395/600 |
| 5,319,543 | 6/1994 | Wilhelm | 364/401 |
| 5,319,777 | 6/1994 | Perez | 395/600 |
| 5,416,842 | 5/1995 | Aziz | 380/30 |
| 5,428,784 | 6/1995 | Cahill, Jr. | 395/650 |
| 5,432,932 * | 7/1995 | Chen et al. | 709/13 |
| 5,483,466 | 1/1996 | Kawahara et al. | 364/514 |
| 5,483,468 * | 1/1996 | Chen et al. | 345/418 |
| 5,499,295 * | 3/1996 | Cooper | 380/23 |
| 5,664,207 | 9/1997 | Crumpler et al. | 395/766 |
| 5,745,879 * | 4/1998 | Wyman | 705/1 |
| 5,752,041 * | 5/1998 | Fosdick | 717/1 |
| 5,758,077 * | 5/1998 | Danaby et al. | 395/200.31 |
| 5,796,633 * | 8/1998 | Burgess et al. | 702/87 |
| 5,864,620 * | 1/1999 | Pettitt | 705/54 |
| 5,878,434 * | 3/1999 | Draper et al. | 707/202 |
| 5,903,897 * | 5/1999 | Carrier et al. | 707/203 |
| 5,938,729 * | 8/1999 | Cote et al. | 709/224 |
| 5,950,209 * | 9/1999 | Carrier et al. | 707/203 |
| 5,960,196 * | 9/1999 | Carrier et al. | 717/1 |
| 6,006,190 * | 12/1999 | Baena-Arnaiz et al. | 705/1 |
| 6,009,401 * | 12/1999 | Horstmann | 705/1 |
| 6,047,242 * | 3/1999 | Benson | 702/35 |
| 6,067,622 * | 5/2000 | Moore | 713/200 |

OTHER PUBLICATIONS

A. Tanenbaum, "Computer Network", Prentice Hall, p. 31, 1996.*

Borland Quattro Pro for Windows User's Guide; Copyright 1987, 1993.

Ultimus–your complete workflow solution; Ultimus LLC; Copyright 1995.

* cited by examiner

Primary Examiner—Frantzy Poinvil
Assistant Examiner—Anil Khatri
(74) Attorney, Agent, or Firm—Rhodes & Mason, PLLC

(57) ABSTRACT

An apparatus for monitoring software usage on a network having a network of computers capable of running at least portions of a computer program. One of the computers in the network acts as a node that monitors the usage by users on the network. The monitoring node is programmed to determine active usage of the computer program by the users on various incidents involving the software, ascertain the total number of unique users using the software at a given time, compare the ascertained total number with an authorized number and issue a signal if the ascertained total number exceeds the authorized number. The present invention further includes a method of determining software license fees for software used intermittently by a plurality of users using the software on a network. The method includes determining active usage of the software by users on the network on various incidents involving the software, ascertaining the total number of unique users using the software at a given time, comparing the ascertained total number with an authorized number, and issuing a signal if the ascertained total number exceeds the authorized number.

26 Claims, 5 Drawing Sheets

| INCIDENT | INITIATOR (STEP A1) | STEP A2 | STEP A3 | STEP A4 | STEP A5 |
|---|---|---|---|---|---|
| 1 | P1 | P2 | P3 | P4 | P5 |
| 2 | P2 | P3 | P5 | P7 | P4 |
| 3 | P8 | P3 | P2 | P4 | P6 |

| TIME | PARTICIPANTS | UNIQUE PARTICIPANTS | NUMBER OF ACTIVE CLIENTS |
|---|---|---|---|
| T1 | P1 | P1 | 1 |
| T2 | P1, P2, P2 | P1, P2 | 2 |
| T3 | P1, P2, P3, P4, P2, P3 | P1, P2, P3, P4 | 4 |
| T4 | P1, P2, P3, P4, P5, P2, P3, P8 | P1, P2, P3, P4, P5, P8 | 6 |
| T5 | P1, P2, P3, P4, P5, P2, P3, P5, P7, P8, P3 | P1, P2, P3, P4, P5, P7, P8 | 7 |
| T6 | P1, P2, P3, P4, P5, P2, P3, P5, P7, P4, P8, P3 | P1, P2, P3, P4, P5, P7, P8 | 7 |
| T7 | P1, P2, P3, P4, P5, P2, P3, P5, P7, P4, P8, P3, P2, P4 | P1, P2, P3, P4, P5, P7, P8 | 7 |
| T8 | P1, P2, P3, P4, P5, P2, P3, P5, P7, P4, P8, P3, P2, P4, P6 | P1, P2, P3, P4, P5, P6, P7, P8 | 8 |
| T9 | P1, P2, P3, P4, P5, P2, P3, P5, P7, P4, P8, P3, P2, P4, P6 | P1, P2, P3, P4, P5, P6, P7, P8, | 8 |
| T10 | P2, P3, P5, P7, P4, P8, P3, P2, P4, P6 | P2, P3, P4, P5, P6, P7, P8 | 7 |
| T11 | P2, P3, P5, P7, P4 | P2, P3, P4, P5, P7 | 5 |
| T12 | NONE | NONE | 0 |

FIG. 5

APPARATUS FOR LICENSING SOFTWARE APPLICATIONS

FIELD OF THE INVENTION

The present invention relates to a software usage determination method and apparatus and more particularly, a computer application for determining the number of clients being serviced by a server in a client-server software application.

BACKGROUND OF THE INVENTION

Traditional user licensing of software is based on two different methods, the per seat license and the concurrent user license. The per seat license provides a method in which anyone who will ever use the software is counted as a licensee. It is most commonly used for stand-alone applications, such as word processors, spreadsheets and CAD software, in which the software is loaded on to each user's computer when it has to be used. Per seat licensing gives the user the right to use the software on his computer. Every user who will use the software must have a license, even if the use is infrequent.

The concurrent user license is based upon how many users are simultaneously connected to the server at any given time. This method is generally used in client-server applications where a substantial portion of the software works on a "server." Concurrent user licensing gives the company the right to have a certain number of users working simultaneously with the server. As soon as a user disconnects from the server, the server is no longer doing any more work of the disconnected user. Consequently, the license may be used by some other user.

Neither method of licensing is equitable or meaningful for a new generation of software applications for which the server usage by a client is persistent even after the client has disconnected. These new software applications are typically designed to perform a "service" which takes a period of time to complete. This means that usage is persistent even after the user has disconnected. Examples of such applications include workflow automation software, e-commerce software, HR software, enterprise resource planning software, help desk, customer care, call centers, etc. In these applications a server can do work for disconnected users in two ways.

A first manner occurs when the user connects with the application or the "server," uses the application to initiate a transaction which will last for some period of time which could range from a few minutes to several months, and then disconnects. Even though the user is no longer connected to the server, the "server" or software application is doing the work. For example, a user initiates a purchase order request using workflow automation software. The user will simply initiate the purchase order workflow by filling out a form. This might take a couple of minutes during which time the user is connected to the workflow server. After the form is complete, the user disconnects from the server and the purchase order workflow process continues as the workflow server takes the purchase order and routes it to various individuals for approval. This might take several days or weeks. The workflow server is doing the work of handling the purchase order throughout this entire time period, even though the user who first initiated the purchase order has disconnected.

A second manner occurs when some other user or event triggers a transaction which can involve a disconnected user. Even though the user is disconnected, the server is doing work for that user by updating the user's task list and sending him e-mail notifications.

For these types of new generation applications where server utilization is persistent even when the user is disconnected, the two conventional methods of licensing are not equitable. The per seat license is not equitable to the customer because in many cases there are users who will only use the software infrequently. The customer has to either buy licenses for all such users or exclude infrequent users from full participation. For example, assume the president of a company is required to approve all purchase orders written for $10,000 or more and the purchase order is initiated and processed through various users of the software. In most cases at this company, the purchase orders are for amounts less than that figure and perhaps only once or twice a month is a purchase order written that needs the president's approval for the high dollar amount. The president of the company has to be a licensed user of the software even though he will only be using the software a few minutes each month. Per seat licensing would therefore discourage companies from fully deploying the software solution because they would try to reduce costs by limiting the deployment to only the most frequent users.

Concurrent User Licenses are not equitable to the software vendor because if a user connects to the server, initiates a transaction or process, and then disconnects, the server may still have to keep on performing work for the user even though the user has disconnected. The software is therefore being used even though the user is disconnected.

Therefore, there is a need to provide a server that monitors the usage of software that is equitable to both the provider and the user of the software.

SUMMARY OF THE INVENTION

This invention fulfills this need in the art by providing for an apparatus for monitoring software usage on a network. The apparatus includes a network of computers capable of running at least portions of a computer program. One of the computers in the network acts as a node that monitors the usage by other users. The monitoring node is programmed to determine active usage of the computer program by the users on various incidents involving the software, ascertain the total number of unique users using the software at a given time, compare the ascertained total number with an authorized number and issue a signal if the ascertained total number exceeds the authorized number.

The network of computers may be configured in a client/server arrangement with the node as the server. The node may further be programmed to determine active usage of the program at discrete intervals, and the intervals may coincide with other housekeeping tasks for the node. The node may further be programmed to ascertain the total number of unique users using the software at a given time by determining the number of current users, determining the incident or incidents that each user is working, calculating a participant list as a sum of all incident participants, and determining the number of unique users. If the number of users is in excess of a predetermined amount, the node may issue a signal indicating this occurrence and provide for a commercial transaction that increases the authorized number. The node may further issue a signal of excess usage to update a usage data storage that is used in sending a periodic accounting of usage for updated billing.

Accordingly, a second aspect of the present invention provides for tracking software usage and includes a number of user computers for running at least one software application. The software performs work on at least one incident, and may perform work on a number of separate incidents. A node or server computer monitors the activity of the incidents. The server determines the number of active users using the software application. An active client user is performing or has performed an activity on at least one of the incidents that remain in progress.

The users may perform work on more than one incident at a given time. The incidents may each include a number of steps that are completed in a defined order in which one of the users initiates the incident by performing a first step. Upon completion of the step, a subsequent step of the incident is started. The steps of the incidents may be performed in a parallel or series arrangement. The incident is completed when all of the steps have been performed.

The server may determine an overall fee for using the software applications that includes a first fee for the time the client user actively uses the software application and a second fee for the remainder of the time that the incident remains in progress. The server may be electronically coupled to the software application via electronic mail, the Internet, intranet, local area network, or data files. The server computer may be connected to a system administrator with the server computer providing messages to a system administrator regarding the status of the incidents, providing feedback to the users, and otherwise managing the incidents. The server may also track the number of unique users accessing the software application and prevent new users from access is when the total number of unique users exceeds a predetermined amount, such as that defined in a licensing agreement.

The present invention also provides a computer readable medium having a program configured to monitor the usage of software applications. The electronic storage medium holds electronic information which is loaded on a server computer and a plurality of user computers electronically coupled to the server computer. The program allows the server computer and user computers to be configured to provide the server computer to track the number of users actively using the software application. Active users are those who have participated in an incident that remains in progress.

A method of determining software license fees for software used intermittently by a plurality of users using the software on computers on a network is also included in the present invention. The method includes determining active usage of the software by users on the network on various incidents involving the software, ascertaining the total number of unique users using the software at a given time, comparing the ascertained total number with an authorized number, and issuing a signal if the ascertained total number exceeds the authorized number. The method may further include sending status reports to an administrator electronically connected to the server computer and denying access to the software by a user when the number of users exceeds a preset number.

BRIEF DESCRIPTION OF THE DRAWINGS

This invention will be better understood from the reading of the detailed description of the preferred embodiment along with a review of the drawings, wherein like items are indicated by the same reference number:

FIG. 5 is a table indicating the participants, unique participants, and active users at each time interval of the incidents shown in FIG. 3.

DETAILED DESCRIPTION OF THE PREFERRED EMBODIMENT

Figure 1:
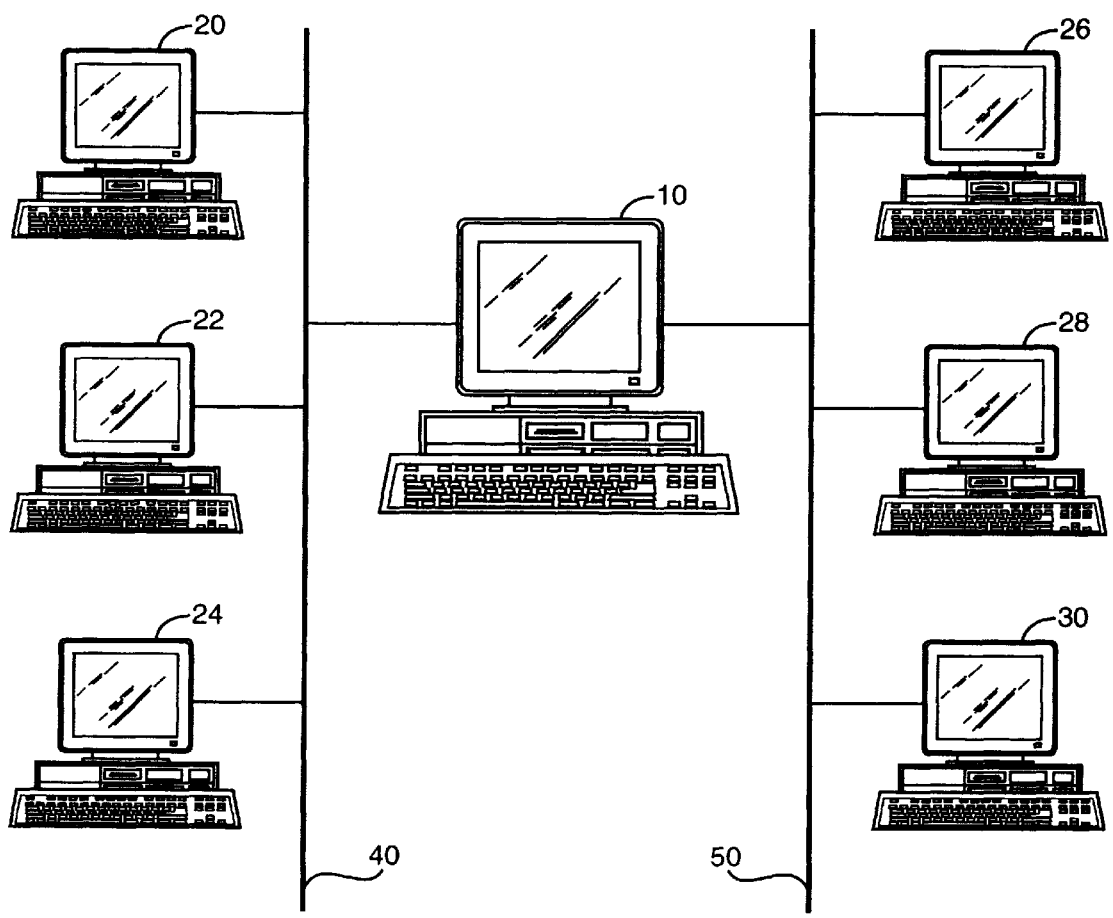
FIG. 1 is a schematic depiction of several computers electronically coupled and equipped with suitable software in accordance with the preferred embodiment of the invention.

With reference to FIG. 1, the invention uses several computers linked together in a configuration allowing electronic communication between them. FIG. 1 shows a server computer 10 and user computers 20, 22, 24, 26, 28 and 30. The computers 20, 22 and 24 are shown linked to the server 10 by a connection like the Internet 40. The computers 26, 28 and 30 are shown linked to the server 10 by a connection like a local area network 50 permitting e-mail communications. The computer system preferably is configured with an operating system like Microsoft Windows 3.1, Windows for Workgroups 3.11, Windows '96, Windows '97, Windows '98 or Windows NT. The preferred e-mail capability is Microsoft Mail, Lotus cc:mail (VIM), Novell/MHS, Groupware or Microsoft Outlook. Other operating systems, communication programs and software as well as any suitable computer hardware may be used.

The present invention is directed to active client licensing in which an active client is defined as any user who has initiated one or more incidents, or request for service, which are still in progress, or any user who is a participant in an incident initiated by others which is still in progress. Therefore, active clients are only those for whom the server is doing some work at that particular time. As soon as a user is no longer participating in any incident still in progress, the user is no longer considered "active".

Figures 2, 3:
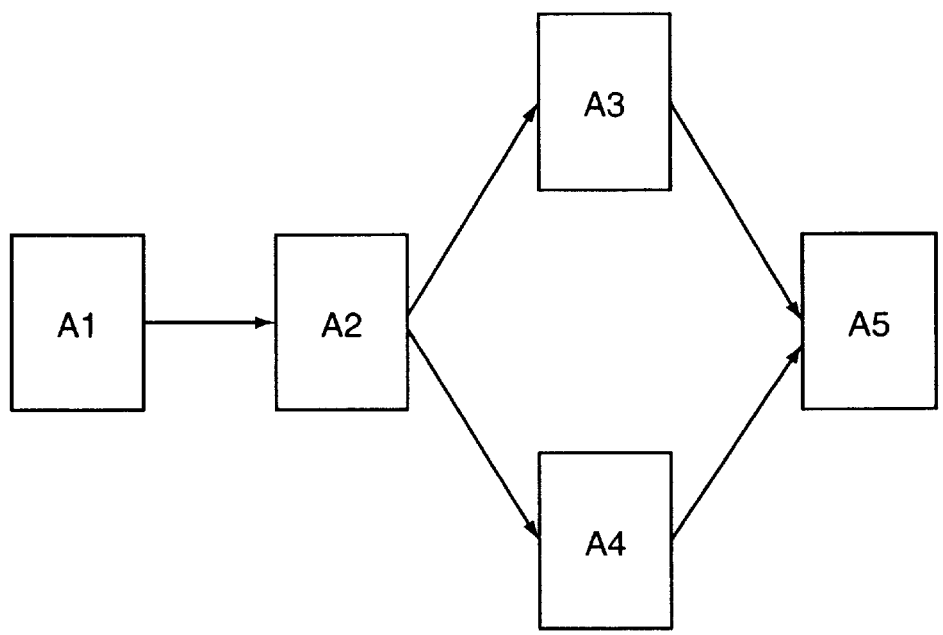
FIG. 2 is a schematic diagram and table illustrating an example of the steps for performing an incident.
FIG. 3 is a table showing examples of the steps of three hypothetical incidents and the sequence of users performing each step.

An incident is defined as a project carried out by computers controlled by one or more individuals performing a number of tasks, in series or in parallel (or some combination of series and parallel paths), to reach a common goal, typically a business process. The sequence and identification of users is determined by the business logic of each company as it chooses to implement the software being licensed. "Business process" should be broadly construed to include processes like those performed by businesses, regardless of who performs them. FIG. 2 illustrates a process having steps A1–A5 which must be performed in order for one incident to be completed. The incident is initiated when an individual begins work on step A1. When the individual completes step 1, this triggers step A2, which when complete, triggers steps A3 and A4 which can be performed in parallel. When both A3 and A4 are complete, the incident moves on to step A5. Upon completion of A5, the workflow incident is considered complete. The various individuals participate in the process by interaction with one or more of user computers 20–24, 26–30. It is understood that the software can be used for tracking incidents of various steps and orientations. The example illustrated in FIG. 2 is used merely for an example and is not intended to limit the scope of the present invention. Depending on the business process, the individuals performing each step of the incident could be the same or could be different. In many real business situations, each step is performed by different individuals based upon their roles or their reporting relationships.

Figure 4:
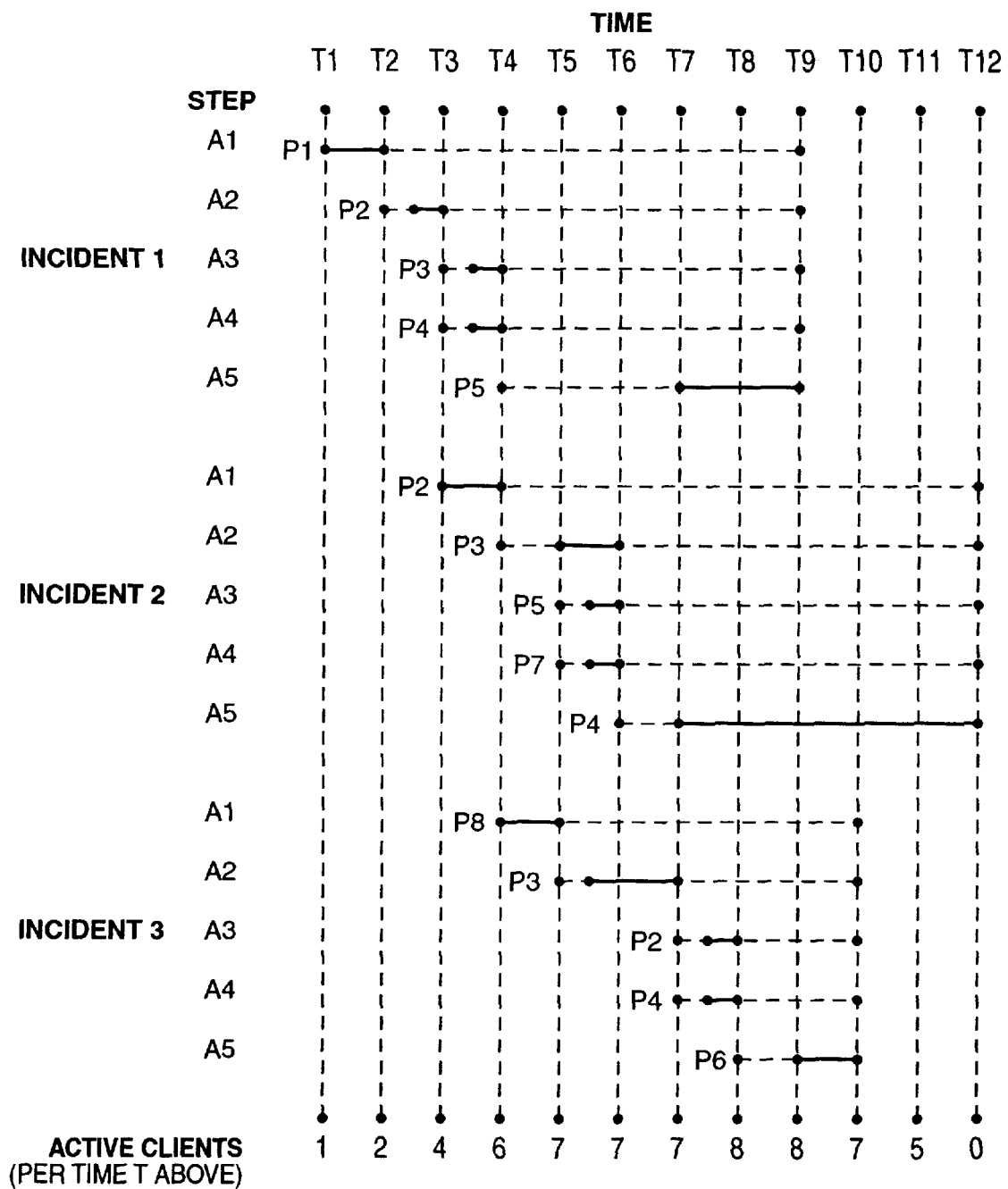
FIG. 4 is a schematic diagram illustrating the time sequence for performing a the incidents shown in FIG. 3.

FIG. 3 illustrates three separate incidents: incident 1; incident 2; and incident 3. By way of example, each of the three incidents consist of five steps as illustrated in FIG. 2 and are performed by separate persons P1–P8. FIG. 4 illustrates a hypothetical timing diagram for the three incidents of FIG. 3 initiated by persons P1, P2 and P8, respectively. The solid line indicates when a user is connected to the server and directly performing a step of the incident. The dashed lines indicate the time when the user is disconnected from the server but the incident involving the user is still in progress and the user is getting a benefit from the computer's completion of the incident.

The time intervals are represented as T1–T12 as illustrated in FIG. 4. The intervals may be any suitable increments such as seconds, minutes, hours, shifts, days, etc. By way of example, incident 2 is initiated by user P2 at time T2. Once P2 completes steps A1 at time T3, P3 is then sent step A2 to perform. P3 begins the step A2 at some point T4 after receiving it. At time T5, P3 has completed step A2, and P5 is assigned step A3 and P7 is assigned step A4, so that steps A3 and A4 are completed in parallel. They need not be simultaneous, but the completion of both is needed for the incident to progress further. Once both steps A3 and A4 are completed at time T6, P4 is assigned step A5. While P4 gets the step A5 at T6, work is not started until T7 since P4 is busy. P4 connects to server at T7 and completes the task at time T12. At this time, the incident is complete, and all of the users involved in incident 2, P2, P3, P5, P7 and P4, are considered inactive for their roles in incident 2. In FIG. 4, the dashed lines indicate when the server is doing work for the person (also called a "user") but the person is not connected to the server. The solid lines indicate the time the person is determined to be actually connected to the server. As a result of being noticed when the server monitors activity, the actual time may be shorter.

Even though each person might take only a fraction of the total incident time connected to the server to perform their tasks, the workflow server continues to perform work for them until the entire workflow incident is complete. This is because the server is performing housekeeping finctions including keeping track of the status of the incident, providing feedback, managing the incident in the person's task list, and readying the return of the workflow to the previous step in case the subsequent step refuses to accept it. Users are counted as participants once they have begun work on an incident and continuing as long as the incident is still in progress. As illustrated in FIG. 4, P6 is part of incident 3 but is not considered active until T8 and continues active until the completion of the incident at T10. P3, also a participant in incident 3, is actively connected to the server from time T5–T7 at which time the step is complete and P3 disconnects from the server. However, P3 is still considered a participant until the end of the incident at time T10.

A single user may be involved in more than one incident at a given time. The user may be actively connected to the server working on more than one incident at the same time, may be actively connected working on only one incident and disconnected but still active in another incident, or may be disconnected but active in numerous incidents. For example, at time T4, user P3 is connected and working on step A3 of incident 1, and also connected to the server performing step A2 on incident 2. The server will monitor the user as a participant for both incidents, but the user will only be counted once as an unique user.

One method of tracking users is to assign each a unique identifying indicia such as an account number or password that must be input at each step to access the software. Without identifying himself at the start of a usage session so that such identifying indicia can be logged, the would-be user will be denied access to the software. A user who has logged on to a single computer and is concurrently working on two or more different steps can thus be identified as participating in the steps involved. Likewise, a user concurrently working on two or more steps from different computers must provide the identifying indicia in each computer so that the server can ascertain which user is working on which incidents and steps.

FIG. 5 illustrates the tracking of active clients by the server. The server monitors the number of active clients at periodic time intervals, such as those illustrated as T1–T12 in FIGS. 4 and 5. Participants are those users from each incident who have either initiated or worked on an incident that is still in progress. By way of example, at time T6 there are twelve participants on the server: P1, P2, P3, P4, P5, P2, P3, PS, P7, P4, P8, P3. Individual users are listed more than once as participants if they are working on more than one active incident at any given time. Unique participants are the number of unique and separate users connected to the server at any given time interval. By way of example, at time T6 there are seven unique participants: P1, P2, P3, P4, P5, P7 and P8. The number of unique participants can then be compared to the number of software licenses authorized for the system.

The present invention is advantageous over the prior art systems, because it provides an equitable and fair means for monitoring usage of software applications. One major advantage of the present system is that there is no up front need to specify which particular users will be considered active clients, because the users become active automatically when they start using the services and become inactive when they stop using the services. This system eliminates the administrative cost of maintaining a user list, which is currently required in many licensing applications. Another advantage of the active client licensing method is that it does not require any monitoring of software loaded at individual user computers. Also, the system does not rely upon the total number of users or the number of users connected to the system but rather relies on the number of users for whom the server is performing a service at any given time.

Figure 6:
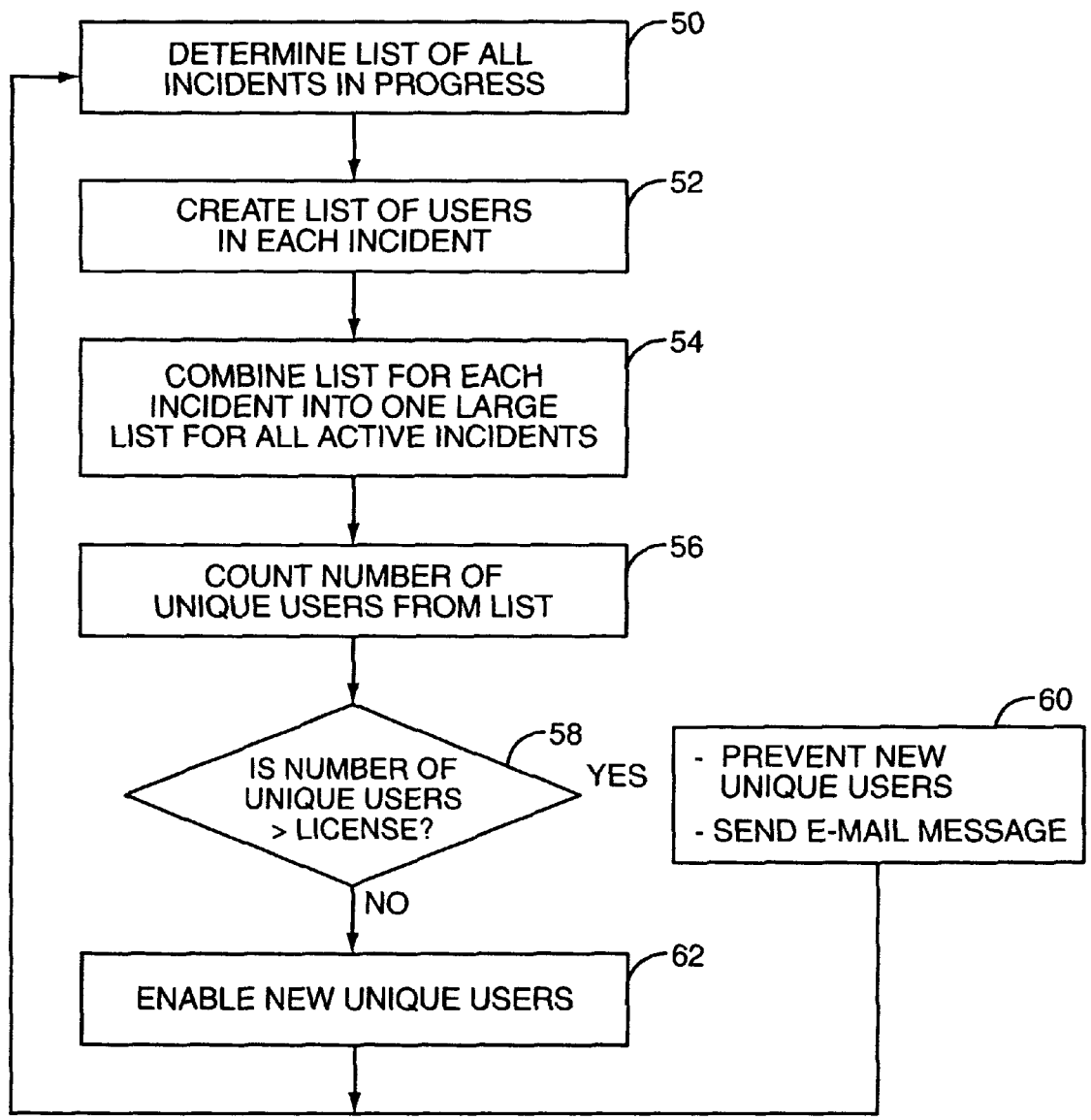
FIG. 6 illustrates a flow chart of the functions performed by a preferred embodiment of the present invention.

FIG. 6 illustrates a flowchart of the methodology of the server computer 10.

The server first determines a list of all active incidents, i.e. incidents which are currently in progress (block 50). From each active incident, the server next generates a list of all users who have participated in that incident up to that time (block 52). The server then combines the list of users for each active incident in one large list for all active incidents (block 54). From this large list, the server then counts the number of unique users (block 56). If the number of unique users is greater than the number authorized by the software license (block 58), an e-mail message is sent to the system administrator, user, or other appropriate party indicating that the license is exceeded, and the server 10 prevents any new and unique user from participating in the incidents (block 60). Otherwise, the server 10 enables new and unique users to participate in the incidents (block 62). This process is then repeated at selected time intervals to determine the number of active users on the system.

The server further functions to monitor the progress of the steps performed by the users. Housekeeping tasks performed by the server include tracking the status of each incident, providing feedback to the users, managing the incident in the user's task list, and readying the return of the incident to the previous step and user in the event the subsequent step refuses to accept due to lack of information. The present invention is capable of monitoring other workflow automation such as that described in applicants' assignee's co-pending U.S. patent application Ser. No. 08/731,435 filed Oct. 15, 1996, incorporated herein by reference in its entirety.

In one embodiment of the present invention, the server tracks the total amount of time a user spends with an incident, both actively connected and not connected but the incident remains in progress, and charges one rate for either type of involvement.

Another embodiment may result in which a user is charged a first rate for the time the user is actively connected to the server and working on an incident, and a second rate for the time the user is disconnected but the incident is still in progress.

The server may also communicate with a system administrator or other person monitoring the user computers. The server may signal the administrator regarding the number of users, the amount of time users are connected to the server, the amount of time for each incident, etc. This information may be used for determining billing arrangements and costs which can be forwarded to the administrator. The server may further notify the administrator when there has been excess usage of the software licensing arrangement. This signal allows the administrator to update the software licensing arrangement to stay in compliance. If no predetermined software licensing scope is in place, the server may send signals regarding the usage amounts and enable the vendor to bill the customer accordingly. One skilled in the art will understand that other billing and monitoring systems can be accommodated depending upon the specific requirements.

The present invention may be designed for a computer readable medium that includes a program configured to monitor the usage of software applications. The system may be available on disk, data file, or other means of electronic data transfer or storage medium capable of holding electronic information. The medium can be loaded onto a server computer and the user computers and electronically coupled to track the status of the incidents and licensing information.

The embodiments shown and described herein have been for the purpose of illustration of the invention. Those of ordinary skill in the art will appreciate that the invention can be carried out in various forms other than those specifically shown. Such variations are deemed to be within the scope of the claims. Also, various combinations and flip combinations of the features of the invention can be used without going beyond the scope of the invention.

What is claimed is:

1. An apparatus for monitoring software usage for a computer program used intermittently by a plurality of users using the program on computers on a network comprising:
   a network of computers capable of running at least portions of a computer program, the usage of which is to be monitored,
   one of the computers in the network acting as a node that monitors usage of the program by active users in the network,
   said monitoring node programmed to
      determine active usage of the program by users on various incidents involving the program, the incidents being configured to take place at two or more computers on the network or to involve two or more users at a single computer, active usage being defined as actual real time participation by a participant in an incident and non-real time benefits from incidents involving a user that has participated or is expected to participate in the incident and thereby be deemed a participant,
      ascertain the total number of unique participants actively using the program for ongoing incidents at a given time,
      compare the ascertained total number with an authorized number, and
      issue a signal if the ascertained total number exceeds the authorized number.

2. An apparatus as claimed in claim 1, wherein said network is configured in a client/server arrangement and said node is a server.

3. An apparatus as claimed in claim 1, wherein said node is programmed to determine active usage of the program at discrete intervals.

4. An apparatus as claimed in claim 3, wherein said intervals take place together with other housekeeping tasks for the node.

5. An apparatus as claimed in claim 1, wherein said node is programmed to ascertain the total number of unique participants using the program for ongoing incidents at a given time by determining the number of current users determining the incident of each of said users, calculating a participant list as a sum of all incident participants, and determining the number of unique active users.

6. An apparatus as claimed in claim 1, wherein said node issues a signal of excess usage to permit a commercial transaction that increases the authorized number.

7. An apparatus as claimed in claim 1, wherein said node issues a signal of excess usage to update a usage data storage that is used in sending a periodic accounting of usage for updated billing.

8. An apparatus for monitoring software usage for software used intermittently by a plurality of users using the software on computers comprising:
   a plurality of client computers running at least one software application for performing work on at least one incident involving said software application, said incident being configured to take place at two or more computers on the network or to involve two or more users at a single computer;
   a server computer connected to said client computers for monitoring the activity of said incident involving said software application; and
   means for determining the number of active users using said software application, wherein active users are those that are participating in an incident in progress and those benefiting from incidents in progress by having participated in the incident previously or by being expected to participate in the incident.

9. An apparatus as claimed in claim 8, wherein said active users perform work on more than one incident.

10. An apparatus as claimed in claim 8, wherein a plurality of active users may access said software application through one of said client computers, and each such user is counted as an active client user.

11. An apparatus as claimed in claim 8, wherein said server determines a licensing fee for using said software applications, said server registering a first fee for the time said user actively uses said software application and a second fee for the remainder of said time that said incident remains in progress.

12. The apparatus of claim 8, wherein each of said incidents includes a plurality of steps completed in a defined order in which one of said active users initiates said incident and upon completion of a first step, a subsequent step of said incident begins, said incident being completed when all of said steps have been performed.

13. The apparatus of claim 12, wherein said steps within said incidents are performed in a parallel arrangement.

14. The apparatus of claim 8, wherein said server computer is electronically coupled to said client computers via electronic mail, Internet, intranet, local area network, or data files.

15. The apparatus of claim 8, wherein said server computer monitors a total number of users accessing said software and a total number of unique active users.

16. The apparatus of claim 15, wherein said server computer outputs to a system administrator, said server computer providing a message to said system administrator regarding the status of said incidents.

17. The apparatus of claim 16, wherein said server computer prevents new unique users from accessing said software application when a total number of active users exceeds a predetermined amount.

18. The apparatus of claim 8, wherein said server computer provides feedback to said users, tracks the status of said incidents, and manages said incidents.

19. A computer readable medium having a program configured to monitor the usage of software used intermittently by a plurality of users comprising an electronic storage medium holding electronic information which, when loaded on a server computer and a plurality of user computers electronically coupled to the server computer, causes said server computer and said user computers to be configured to enable said server computer to track the number of users actively using said software, active usage being defined as actual real time participation by a participant in an incident and non-real time benefits from incidents involving a user that has participated in the incident or is expected to participate in the incident and thereby be deemed a participant by determining the number of participants who have participated in an incident involving said software that remains in progress.

20. The apparatus of claim 19, wherein said server computer outputs to a system administrator, said server computer providing information to said system administrator including number of active users and status of each of said incidents.

21. A method of determining software license fees for software used intermittently by a plurality of users using the software on computers on a network comprising:

determining active usage of the software by ones of the users on the network on various incidents involving the software, said incidents being configured to take place at two or more computers on the network or to involve two or more users at a single computer, active usage being defined as actual real time participation by a participant in an incident and non-real time benefits from incidents involving a user that has participated or is expected to participate in the incident and thereby be deemed a participant;

ascertaining the total number of unique participants using the software at a given time;

comparing the ascertained total number with an authorized number; and issuing a signal if the ascertained total number exceeds the authorized number.

22. The method as claimed in claim 21, further comprising the step of sending status reports to an administrator.

23. The method of claim 21, further comprising the step of denying access to said software by a user when said number of active users exceeds said authorized number.

24. The method of claim 21, further comprising the step of accruing a first fee for active usage time and a second fee for the remainder of the time the incident remains in progress.

25. A method of determining software license fees for software used intermittently by a plurality of users using the software on computers on a network comprising:

determining active usage of the software by ones of the users on the network on various incidents involving the software, said incidents being configured to take place at two or more computers on the network or to involve two or more users at a single computer, active usage being defined as actual real time participation by a participant in an incident and non-real time benefits from incidents involving a user that has participated in the incident and thereby be deemed a participant;

ascertaining the total number of unique participants using the software at a given time;

comparing the ascertained total number with an authorized number; and issuing a signal if the ascertained total number exceeds the authorized number.

26. A method of determining software license fees for software used intermittently by a plurality of users using the software on computers on a network comprising:

determining active usage of the software by ones of the users on the network on various incidents involving the software, said incidents being configured to take place at two or more computers on the network or to involve two or more users at a single computer, active usage being defined as actual real time participation by a participant in an incident and non-real time benefits from incidents involving a user that is expected to participate in the incident and thereby be deemed a participant;

ascertaining the total number of unique participants using the software at a given time;

comparing the ascertained total number with an authorized number; and issuing a signal if the ascertained total number exceeds the authorized number.

* * * * *